United States Patent
Seppänen

(10) Patent No.: US 10,506,096 B2
(45) Date of Patent: *Dec. 10, 2019

(54) GENERATION OF INFORMATION BASED ON EVENT DATA OF A CALL

(71) Applicant: Telia Company AB, Solna (SE)

(72) Inventor: Juho Seppänen, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,565

(22) Filed: May 23, 2018

(65) Prior Publication Data

US 2018/0343340 A1    Nov. 29, 2018

(30) Foreign Application Priority Data

May 24, 2017 (FI) ...................... 20175470

(51) Int. Cl.
*H04M 3/02* (2006.01)
*H04M 3/42* (2006.01)

(52) U.S. Cl.
CPC ......... *H04M 3/02* (2013.01); *H04M 3/42093* (2013.01); *H04M 3/42017* (2013.01); *H04M 2201/14* (2013.01); *H04M 2207/12* (2013.01)

(58) Field of Classification Search
CPC ............................ H04M 3/02; H04M 2207/12
See application file for complete search history.

(56) References Cited

U.S. PATENT DOCUMENTS

| | | | | |
|---|---|---|---|---|
| 7,783,283 | B2 * | 8/2010 | Kuusinen | H04M 1/575 455/412.2 |
| 8,060,069 | B1 | 11/2011 | Lai et al. | |
| 2002/0160810 | A1 * | 10/2002 | Glitho | H04Q 3/0029 455/560 |
| 2008/0112395 | A1 * | 5/2008 | Zhu | H04Q 3/0029 370/352 |
| 2010/0297986 | A1 * | 11/2010 | Cermak | H04M 3/42374 455/414.1 |

(Continued)

FOREIGN PATENT DOCUMENTS

| | | |
|---|---|---|
| CN | 106657682 A | 5/2017 |
| EP | 1578101 A1 | 9/2005 |

OTHER PUBLICATIONS

FI Search Report, dated Nov. 17, 2017, from corresponding FI application No. 20175470.

(Continued)

*Primary Examiner* — Asghar H Bilgrami
(74) *Attorney, Agent, or Firm* — Young & Thompson

(57) ABSTRACT

A server, a system, a computer program product, and a method for generating information relating to a subscriber B with respect to a call connection attempt from a subscriber A to the subscriber B by a server. The method including steps of receiving event data; determining when the event data comprises an event representing a busy state; determining when the previous event represents a call ringing state; generating an indication that the call connection attempt is rejected by the subscriber B; and in response to a determination that the previous event does not represent the call ringing state, generating an indication that the call connection attempt did not reach the subscriber B.

18 Claims, 4 Drawing Sheets

(56) References Cited

U.S. PATENT DOCUMENTS

| | | | |
|---|---|---|---|
| 2011/0134804 A1* | 6/2011 | Maes | H04M 7/0012 370/259 |
| 2012/0033798 A1* | 2/2012 | Eardley | H04M 3/54 379/211.01 |
| 2012/0250847 A1* | 10/2012 | Wang | H04M 1/72522 379/207.16 |
| 2014/0321454 A1* | 10/2014 | Verbil | H04M 1/2535 370/352 |
| 2016/0173696 A1* | 6/2016 | Nortz | H04L 29/12377 370/250 |
| 2017/0331950 A1* | 11/2017 | Glod | H04M 3/42042 |
| 2018/0014168 A1* | 1/2018 | Lau | H04M 7/0048 |
| 2018/0103500 A1* | 4/2018 | Chiang | H04W 76/18 |

OTHER PUBLICATIONS

European Search Report for Application No. 18 17 3489, dated Sep. 27, 2018.

* cited by examiner

GENERATION OF INFORMATION BASED ON EVENT DATA OF A CALL

TECHNICAL FIELD

The invention concerns in general the technical field of telecommunications. Especially the invention concerns a determination of subscriber behavior based on event data.

BACKGROUND

Telecommunication networks enable a development of a wide variety of value added services which may be used by subscribers residing in an operational area of a telecommunication network. One area of value added services relate to provision on information relating to connection attempts. For example, a service may be configured to monitor connection attempts directed to a certain subscriber and to generate and to provide information with respect to the connection attempts, such as calls, to the subscriber in question. At the same time the service shall be implemented so that it does not generate unnecessary signaling to the subscriber in order to prevent the subscriber to become irritated on the messaging.

The problem in an implementation of services in the area of connection attempts, typically missed connection attempts, is that mobile communication networks typically do not generate information by means of which it is possible to distinguish a reason for an unsuccessful connection attempt. For example, from the service point of view it would be advantageous to distinguish at least connection attempts which are actively rejected by a recipient and the connection attempts in which the recipient has not taken any actions when missing the connection attempt.

Hence, there is need to introduce approaches by means of which it is possible to establish improved services for subscribers in telecommunication networks.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a server, a system and a computer program product for generating information on a call connection attempt. Another objective of the invention is that the method, the server, the system and the computer program product enables improved awareness of call connection attempts of a user.

The objectives of the invention are reached by a method, a server, a system and a computer program product as defined by the respective independent claims.

According to a first aspect, a method for generating information relating to a subscriber B with respect to a call connection attempt from a subscriber A to the subscriber B by a server is provided, the method comprises: receiving event data representing the call connection attempt related events; determining if the event data comprises an event representing a busy state; in response to a determination that the event data comprises the event representing the busy state determining if the previous event to the event representing the busy state represents a call ringing state; in response to a determination that the previous event to the event representing the busy state represents the call ringing state generating an indication that the call connection attempt is rejected by the subscriber B; and in response to a determination that the previous event to the event representing the busy state does not represent the call ringing state generating an indication that the call connection attempt did not reach the subscriber B.

The method may further comprise, in response to a determination that the previous event to the event representing the busy state represents the call ringing state, that: duration of the ringing state is determined; the duration is compared to a timeout value representing a value of time defining a period of time of rejecting the call connection attempt by a communication network implementing the call connection attempt; and in response to a detection that the duration of the ringing state exceeds or corresponds to the timeout value, generating an indication that the call connection attempt is rejected by the communication network; and in response to a detection that the duration of the ringing state is below the timeout value, generating the indication as described that the call connection attempt is rejected by the subscriber B. The duration of the ringing state may be determined by one of the following: by determining a period of time between an instant of time when the event representing the busy state is received and an instant of time when the event representing the ringing state is received, by obtaining a timer value triggered in response to a receipt of the ringing state and stopped in response to the receipt of the busy state.

The event data may be received from an intelligent network.

Further, the event data received may be stored in a memory accessible by the server.

The determination with respect to the event may be performed by: obtaining at least one identifier from the event data; and comparing it to at least one comparison data value representing at least one state of a subscriber.

The method may further comprise: generating a notification to the subscriber B in response to the generation of the indication that the call connection attempt has not reached the subscriber B.

According to a second aspect, a server for generating information relating to a subscriber B with respect to a call connection attempt from a subscriber A to the subscriber B is provided, the server comprising: at least one processor; at least one memory including computer program code; the at least one memory and the computer program code configured to, with the at least one processor, cause the server to perform: receive event data representing the call connection attempt related events; determine if the event data comprises an event representing a busy state; in response to a determination that the event data comprises the event representing the busy state determine if the previous event to the event representing the busy state represents a call ringing state; in response to a determination that the previous event to the event representing the busy state represents the call ringing state generate an indication that the call connection attempt is rejected by the subscriber B; and in response to a determination that the previous event to the event representing the busy state does not represent the call ringing state generate an indication that the call connection attempt did not reach the subscriber B.

The server may further be configured to, in response to a determination that the previous event to the event representing the busy state represents the call ringing state: determine duration of the ringing state; compare the duration to a timeout value representing a value of time defining a period of time of rejecting the call connection attempt by a communication network implementing the call connection attempt; and generate, in response to a detection that the duration of the ringing state exceeds or corresponds to the timeout value, an indication that the call connection attempt is rejected by the communication network; and generate, in response to a detection that the duration of the ringing state is below the timeout value, the indication as described in the previous paragraph that the call connection attempt is rejected by the subscriber B.

The server may be configured to determine the duration of the ringing state by one of the following: by determining a period of time between an instant of time when the event representing the busy state is received and an instant of time when the event representing the ringing state is received, by obtaining a timer value triggered in response to a receipt of the ringing state and stopped in response to the receipt of the busy state.

Further, the server may be configured to receive the event data from an intelligent network.

The server may be configured to store the event data in a memory accessible by the server.

Moreover, the server may be configured to perform the determination with respect to the event by: obtaining at least one identifier from the event data; and comparing it to at least one comparison data value representing at least one state of a subscriber.

The server may further be configured to: generate a notification to the subscriber B in response to the generation of the indication that the call connection attempt has not reached the subscriber B.

According to a third aspect, a system for generating information relating to a subscriber B with respect to a call connection attempt from a subscriber A to the subscriber B, the system comprising: a call connection unit, a server, in the system the server is configured to: receive event data representing the call connection attempt related events from the call connection unit; determine if the event data comprises an event representing a busy state; in response to a determination that the event data comprises the event representing the busy state determine if the previous event to the event representing the busy state represents a call ringing state; in response to a determination that the previous event to the event representing the busy state represents the call ringing state generate an indication that the call connection attempt is rejected by the subscriber B; and in response to a determination that the previous event to the event representing the busy state does not represent the call ringing state generate an indication that the call connection attempt did not reach the subscriber B.

According to a third aspect, a computer program product comprising at least one computer-readable storage medium having computer-executable program code instructions stored therein for performing the method as described above when the computer program product is executed on a computer, such as in a server comprising necessary computing resources.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF SOME EMBODIMENTS

In the following description a caller is referred with a term subscriber A and a callee is referred with subscriber B, both equipped with user equipment. The subscriber is defined in the network as a predetermined data entity identifying the subscriber in the network and to whom the network may provide the network services in use. Both the caller and the caller may use any equipment by means of which it is possible to utilize the network services, such as attempting a connection establishment through a mobile communication network. In order to have an access to the mobile communication network the user equipment (UE) may be equipped with a subscriber identity module (SIM) storing the subscriber identity and authentication related information to be utilized in the communication through the mobile communication network. The subscriber identity module may be provided physically with UICC (Universal Integrated Circuit Card) in the user equipment or at least partly with a software solution implemented in the user equipment.

Figure 1:
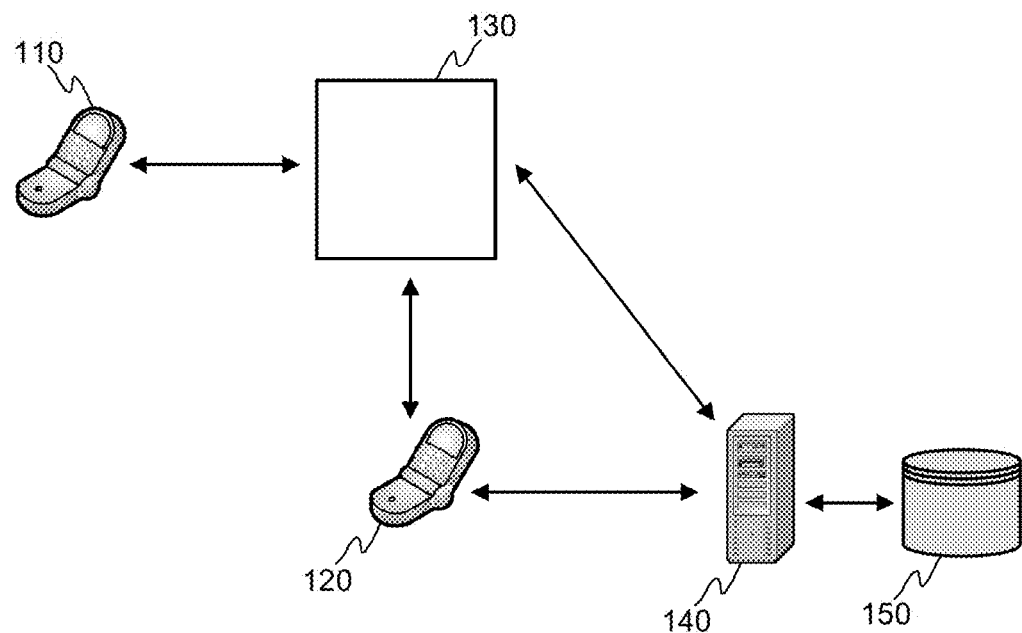
FIG. 1 illustrates schematically a communication environment according to an embodiment of the invention.

Some aspects relating to the present invention is now described by referring to FIG. 1. FIG. 1 illustrates schematically an environment of the invention wherein the relevant entities from the invention point of view are depicted. Subscriber A 110 aims to reach subscriber B 120 by initiating a call connection through a connection control unit 130. The connection control unit 130 may be configured to perform typical operations relating to call setup, such as querying information on the subscriber B 120 from a register in order to route the call in a correct way. The connection control unit 130 may also be configured to check, e.g. in response to a receipt of call connection, if the subscriber B 120 has activated a service, such as a service providing information on connection attempts. The connection control unit 130 may be communicatively coupled to a network node called as a server 140 from now on for providing information to and from the server 140 either directly or indirectly as will be described. The information provided to the server 140 may comprise, but is not limited to, information relating to the call connection derived by the connection control unit 130. The connection control unit 130 may refer to a Mobile Switching Centre (MSC) functioning as a core network element in 2G or 3G mobile communication network, or any similar network in which a network element performs corresponding functions. Alternatively or in addition, the connection control unit 130 may refer to a Call Session Control Function (CSCF) being used for controlling signaling among other tasks in IP Multimedia Subsystem. The mentioned entities are non-limiting examples. Moreover, the connection control unit 130 may be configured to be communicatively coupled to other entities, such as to one or more registers maintaining necessary information for implementing the present invention and to other networks, such as to an intelligent network (IN) being involved in an establishment of connection attempt. The other entities are not illustrated in FIG. 1.

As schematically illustrated in FIG. 1 the subscriber A and the call connection unit 130 may be communicatively coupled to each other as well as the call connection unit 130 and the subscriber B 120. Moreover, the call connection unit 130 and the server 140 may be advantageously communicatively coupled together in order to transfer, either directly or indirectly, at least event data relating to call connection from the call connection unit 130 to the server 140. The communication may also be bidirectional i.e. the server 140 may also transmit data to the call connection unit 130. Further, the server 140 may be communicatively coupled to data storage 150 as well as to the subscriber B 120, but also to the subscriber A 110, over a communication channel, such as a communication channel implemented with a messaging infrastructure.

Figure 2:
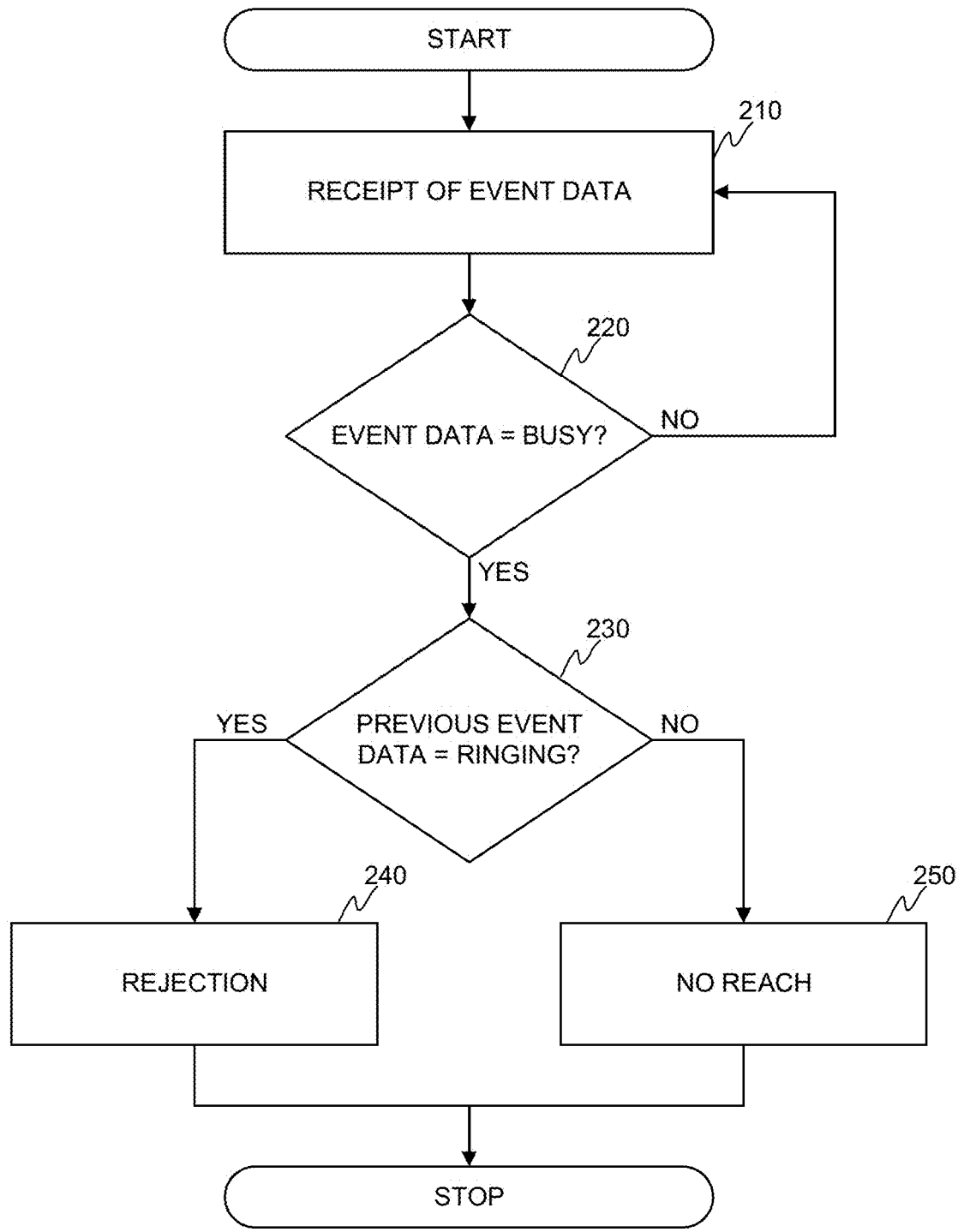
FIG. 2 illustrates schematically a method according to an embodiment of the invention.

Next, some aspects relating to the present invention is described by referring to FIG. 2 in which an embodiment of a method is disclosed. One outcome of the method may be a generation of state information of the subscriber B 120 with respect to the call connection attempt from a subscriber A 110 to the subscriber B 120, as will be described. The state information may comprise, but is not limited to, state information at the time of the call connection attempt, but also information representing possible user actions with respect to the call connection attempt.

The call connection attempt may be initiated by the subscriber A 110 with the user equipment and an applicable communication application executed by the user equipment. The call connection attempt may be forwarded by the connection control unit 130 to the subscriber B 120. The call connection unit 130 may comprise functionality by means of which it is possible to generate event data at least with respect to the call connection attempt. The event data may refer to data from which it may be derived information on different states regarding the call connection attempt. The term 'state' in this context shall be understood to cover also information generated by the subscriber B 120 if the user has taken an action with respect to the call connection attempt. For example, the state information may refer to, but is not limited to, state information called 'ringing' which is received from the recipient of the call connection if the call alert is generated by the user equipment. The state information may also refer to state information 'busy' which may e.g. be generated if the user or the user equipment at the subscriber B end rejects the call connection or if the call connection cannot be entered to calling state due to fact that it is reserved for an earlier call connection, for instance. The generation of the event data by the call connection unit 130 may comprise, but is not limited to, obtaining the information from signaling received from the subscriber B in response to the call connection attempt.

Next a method according to an embodiment is described in such an implementation in which the connection control unit 130 may be configured to deliver state information to a server 140 wherein the state information may represent a state of the subscriber B 120 at the time when the call connection attempt reaches the subscriber B 120. Prior to delivering the state information to the server 140 the connection control unit 130 may be configured to determine, either internally or by obtaining information from external source, if it shall deliver the state information to the server 140 or not. This may correspond to an activation of a specific service in the network for the subscriber B 120. As already mentioned, the connection control unit 130 may refer to Mobile Switching Centre (MSC) or Call Session Control Function (CSCF), which entities may be configured to obtain information from one or more registers, such as Home Location Register (HLR) or Home Subscriber Server (HSS), the information to be obtained comprising information if the service is activated or not. Depending on the information the connection control unit 130 initiates delivering, or transmitting, the state information to the server 140.

In the following it is described at least some method steps which may be performed by the server 140:

Regarding Step 210:

As described above the connection attempt is delivered from the subscriber A 110 to the subscriber B 120 through the connection control unit 130. The connection attempt reaches the subscriber B 120 and the connection control unit 130 may receive event data e.g. from the subscriber B 120 or by monitoring the communication channel, i.e. control data therein. As a result the connection control unit 130 may receive data representing one or more events with respect to the call connection attempt. The connection control unit 130 may be configured to transmit the data representing the one or more events with respect to the call connection attempt to the server 140 which is configured to receive the event data 210. Additionally, in some embodiment the received data may be stored, either temporarily or permanently, in data storage, such as in a memory, accessible by the server 140.

Regarding Step 220:

In response to the receipt of the data representing the one or more events with respect to the call connection the server 140 may be configured to determine, i.e. to detect, predetermined events from the received event data. In step 220 the server 140 may be configured to determine if the event data comprises an event, which represents a busy state of the subscriber B 120. In other words, the server 140 may be configured to monitor and identify from the received event data if there exists data representing a busy state of the subscriber B 120 from any reason in response to the call connection attempt. The reason for busy state may e.g. be that the subscriber B has already an active connection with some other party. Moreover, the busy state may be due to a fact that the subscriber B has executed some predetermined action for indicating that the call connection may not be accepted. For example, the user of the user equipment representing the subscriber B 120 may have performed a predetermined action for rejecting the connection attempt, when the user equipment has generated an indication, such as an alarm, of the connection attempt.

The determination if the received event data comprises an event representing the busy state of the subscriber B 120 may e.g. be based on a comparison of at least one identifier obtained from an event data message to comparison data value or values stored in data storage accessible by the server 140. The identifier may refer to at least one predetermined data value by means of which the state information may be represented. The comparison data value or values may define a type of an event so that by comparing the received event data, i.e. the identifier, to the comparison data value it is possible to determine the type of the event relating to the connection attempt.

In case no event representing the busy state of the subscriber B 120 is determined the receipt of event data 210 may be continued from the connection control unit 130. Additionally, the event data may be stored as a data record to data storage accessible by the server 140 so that the server 140 may obtain the event data from there for purposes as will be described. Especially, if the event data does not represent the busy state the event data may be stored in the data storage.

Regarding Step 230:

In response to a determination that the event data comprises an event representing the busy state of the subscriber B 120 it may be determined if a previous event of the subscriber B 120 to the event representing the busy state represents a call ringing state. In order to do this the server 140 may obtain from data storage, such as from a memory, event data relating to the call connection attempt, and especially to determine if the previous event to the event representing the busy state corresponds to a so called ringing state. The ringing state may refer to an event that the call connection attempt has reached the subscriber B 120.

The determination may again be performed based on identifiers of the event data message in the same manner as described above in the context of step 220.

Regarding Steps 240 and 250:

Depending on the outcome of the determination in the step 230 the server 140 may be configured to proceed in a variety of ways. In case an outcome of the determination in step 230 is that the previous event to the event representing the busy state represents the call ringing state the server 140 may be configured to generate an indication that the call connection attempt is rejected 240 by the subscriber B 120. On the other hand, if the outcome of the determination in step 230 is that the previous event to the event representing the busy state does not represent the call ringing state the server 140 may be configured to generate an indication that the call connection attempt has not reached 250 the subscriber B 120.

In some embodiment it may be arranged that a duration time of ringing state is utilized in a sophisticated way in the context of the present invention. Namely, it may be arranged that the duration of the ringing time may be generated by the server 140 in one way or another. For example, the server 140 may be configured to determine an instant of time when the event data representing the ringing state is received in the server 140. Additionally, it may determine an instant of time when the event data representing the busy state is received in the server 140. As a result, the server 140 may determine the duration of the ringing time by determining the period of time between the mentioned two instants of time. Alternatively, the receipt of the event data representing the ringing state may trigger a timer in the server 140, which is stopped when the event data representing the busy state is received and the timer value represents the duration of the ringing state. The mentioned mechanisms to determine the ringing time are non-limiting examples, and further mechanisms may be applied to. The server 140 may also store a time limit, called e.g. a network timeout value, which represents the time limit when the network is configured to cancel the call connection attempt if it is not answered. Now, by comparing the determining duration of the ringing state, i.e. the duration of the call connection attempt, to the time limit i.e. the timeout value, the server 140 may determine if the call connection attempt is actively rejected or automatically by the network. In other words, if the duration exceeds the timeout value or corresponds to it, it may be concluded the busy state origins from the network functionality i.e. the network timeout and, thus, the call connection attempt is rejected by the network. Alternatively, if the duration is below the timeout value, it may be concluded that the rejection origins from the subscriber B 140. This kind of functionality may be implemented in the server 140 and performed in step 230, for example.

As mentioned above, the server 140 may be configured to perform a dedicated service into which at least one of the mentioned generated indications may be used as an input. Such a service may e.g. be one by means of which the subscriber B 120 may be informed on one or more missed connection attempts. Namely, in order to optimize the amount of information the server 140 may be configured to operate so that if the determination indicates that the call connection attempt was rejected by the subscriber B 120 no any notification is generated to the subscriber B 120 due to the fact that the subscriber B is already aware of the connection attempt. This is because the user of the user equipment of the subscriber B 120 has taken actions with respect to the connection attempt i.e. actively rejected it. On the other hand, if the determination as described indicates that the subscriber B 120 was busy at the time of the connection attempt and during the connection attempt there has not been the call ringing state before the busy state (i.e. the step 250), the server 140 may be configured to generate a notification on the missed connection attempt from the subscriber A 110. In order to provide the information on the caller, i.e. the subscriber A 110, the server 140 may receive e.g. an identifier, such as MSISDN number, from the connection control unit 130 e.g. together with the event data. Advantageously, the destination identifier, such as a MSISDN number of the subscriber B 120, may be transmitted in the same signaling to the server 140. The server 140 may also be configured to obtain any further information from data storage 150 for the generation of the notification. The further information may comprise, but is not limited to, information on a preferred communication channel for transmitting the notification to the subscriber B 120, a format of the notification, status information on subscriber B 120, a schedule for transmitting the notification, caller name identifier and so on.

The server 140 as referred above may refer to an external network device to the connection control unit 130 or it may belong to the connection control unit 130. For example, the Next Generation Intelligent Network (NGIN) may comprise an application server 140 which may be configured to implement at least some of the method steps, as described above. Moreover, the functionality of the server 140 may be performed by one server device or by distributed server implementation.

Figure 3A:
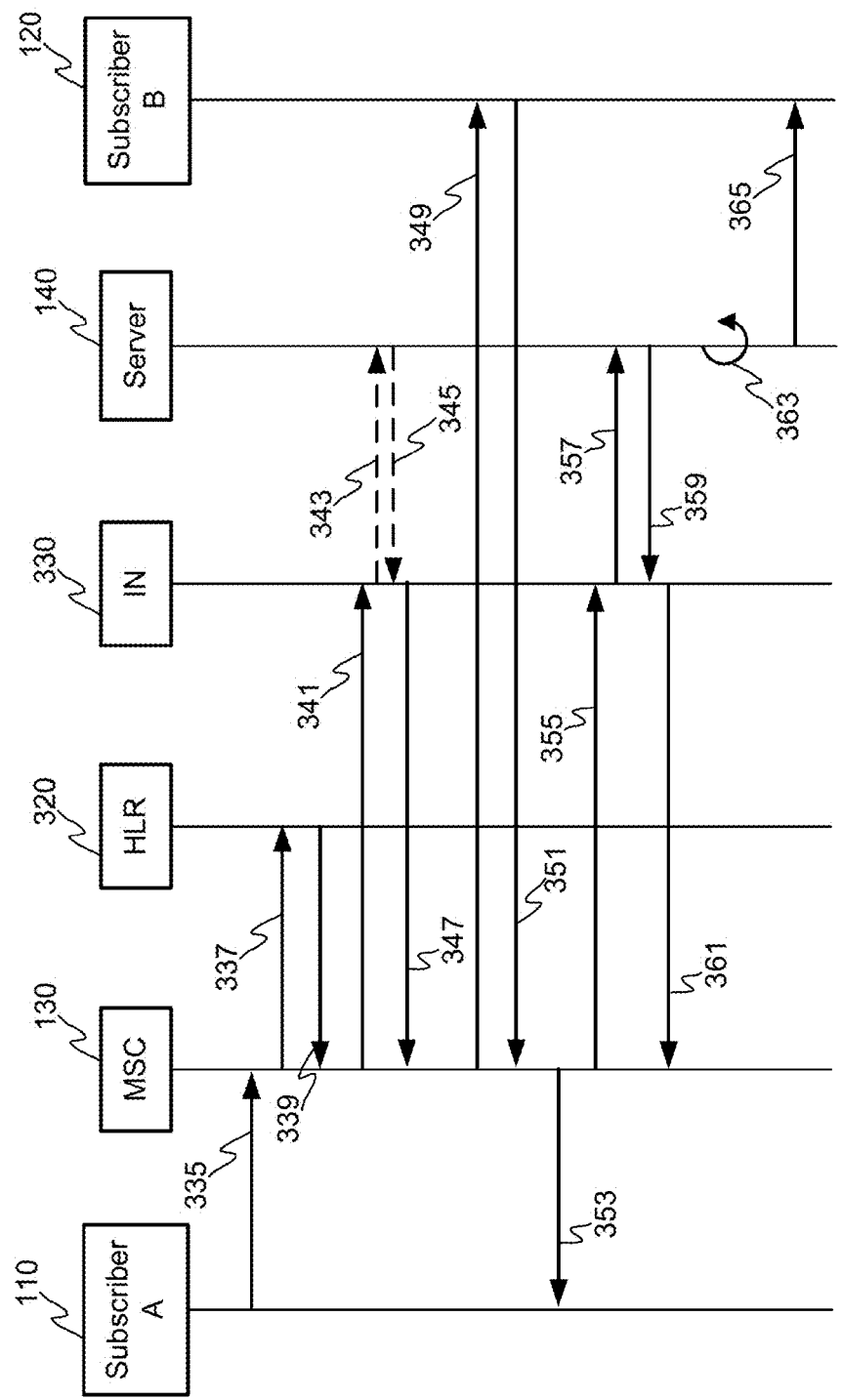
FIGS. 3A and 3B illustrate schematically signaling between elements in some communication environments according to some embodiments of the invention.

FIG. 3A schematically illustrates a signaling in an embodiment in which a functionality of the connection control unit 130 is implemented with network node belonging to a mobile communication network, such as MSC, and wherein an intelligent network 330 is configured to perform call connection related operations. Now, the subscriber A 110 may initiate a call connection attempt which is signaled to MSC with signal 335. The MSC may be configured to perform typical operations, such as obtaining location information among other necessary information on the subscriber B 120 for routing the connection attempt in a correct way. This is indicated with signals 337 and 339 in FIG. 3A. In response to that the intelligent network 330 may be informed on the call connection attempt with necessary information (cf. signal 341 in FIG. 3A). In some embodiment the intelligent network may be configured to inform the server 140 already at this stage on the incoming call from subscriber A 110 to subscriber B 120 (signals 343 and 345 wherein 345 refers to acknowledging). This is optional operation. Further, the intelligent network 330 may acknowledge the received information to the MSC (signal 347 in FIG. 3A) and in that manner to indicate to MSC that the call connection attempt may be continued. In response to this the MSC may be configured to route the call connection attempt to subscriber B 120 (signal 349) and in response to that the subscriber B 120 may generate event data, such as state information as described, which is signaled to the MSC (signal 351). The event data may be transmitted to the subscriber A 110 (signal 353 in FIG. 3A). As said the subscriber A 110 may receive indication on a ringing or a busy state, for example. Furthermore, the MSC may be configured to transmit the event data to the server 140 through the intelligent network 330 (signals 355 and 357). The server 140 may be configured to acknowledge (signal 359) the receipt of information to the intelligent network 330, which in turn acknowledges to the MSC (signal 361). The server 140 may, in response to the receipt of the event data, be configured to perform the method as schematically illustrated in FIG. 2 (referred with arrow 363 in FIG. 3A). As said, in case the subscriber B 120 is not reached under the condition described earlier the server 140 may be configured to generate a notification on a missed call connection attempt to the subscriber B 120 (signal 365 in FIG. 3A). It is worthwhile to mention that a specific check if the functionality according to the present invention is set up for the subscriber B 120 may be performed at some instant of the process. Namely, the MSC may be configured to perform the check e.g. immediately in response to the receipt of the call connection attempt (signal 335 in FIG. 3A) so that the information is obtained already when receiving the signal 351 comprising event data from the subscriber B 120.

Figure 3B:
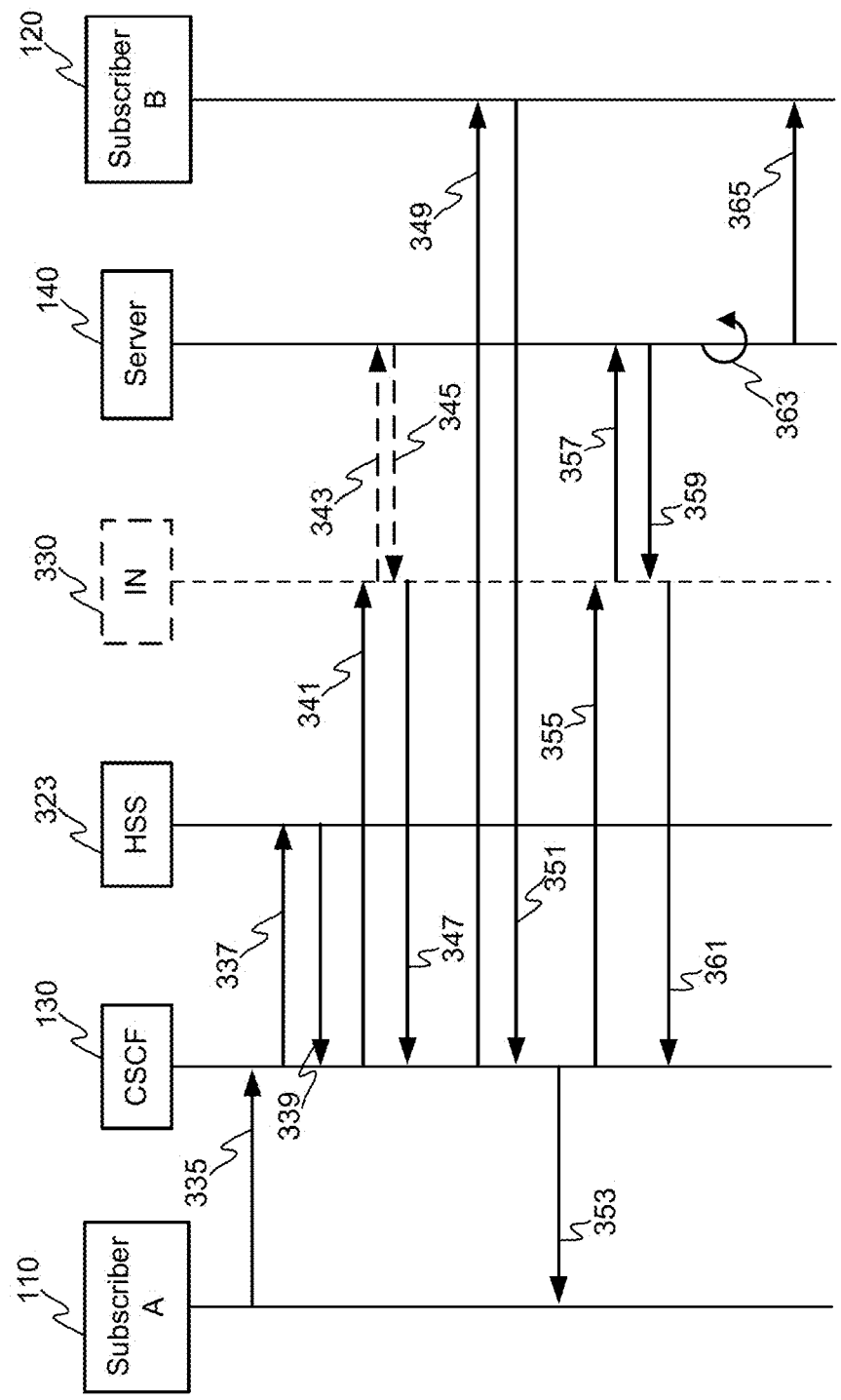

FIG. 3B schematically illustrates a signaling in an embodiment in which a functionality of the connection control unit 130 is implemented with network node belonging to IP multimedia subsystem, such as CSCF, and the HLR in FIG. 3A is replaced with HSS 323. The implementation of FIG. 3B may or may not utilize an intelligent network 330. In case the intelligent network 330 is utilized the signaling corresponds to the signaling of FIG. 3A. On the other hand, if the intelligent network 330 is not utilized, the connection control unit 130, i.e. the CSCF, communicates directly with the server 140.

Figure 4:
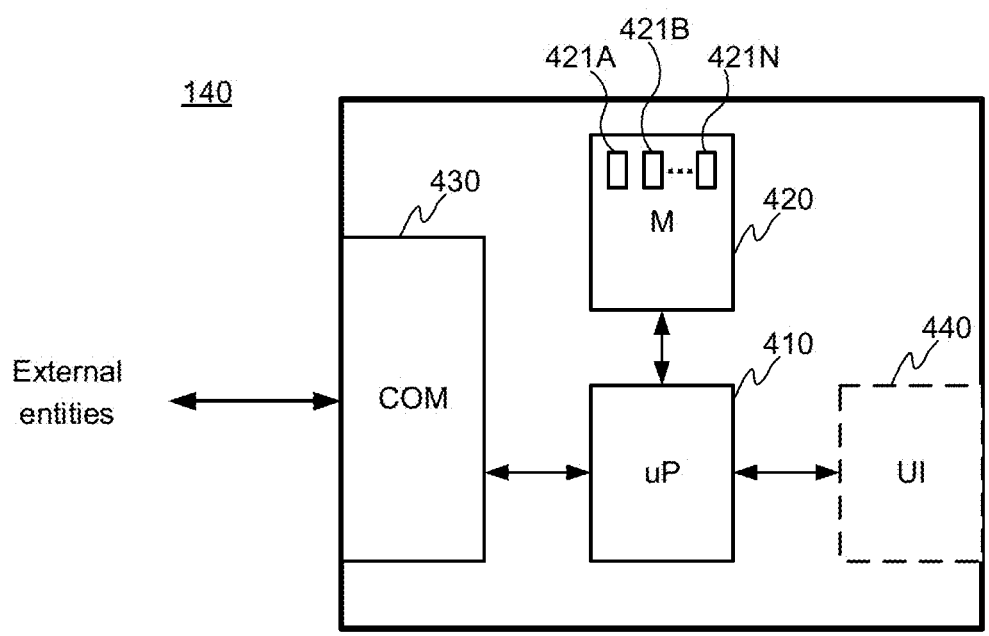
FIG. 4 illustrates schematically a server according to an embodiment of the invention.

FIG. 4 discloses an example of a server 140 according to an embodiment of the invention. The server 140 may comprise one or more processors 410, one or more memories 420 being volatile or non-volatile for storing portions of computer program code 421a-421n and any data values, a communication interface 430 and possibly one or more user interface units 440. The mentioned elements are communicatively coupled to each other with e.g. an internal bus. The communication interface provides interface for communication with any external units needed in a certain implementation of the present invention as described, such as with one or more network nodes implementing a communication channel to the server or any user equipment. The communication inter-face may be based on one or more known communication technologies, either wired or wireless, in order to exchange pieces of information as described earlier.

The processor 410 of the server 140 is at least configured to implement at least some steps of the solution as described. The implementation of the method may be achieved by arranging the processor 410 to execute at least some portion of computer program code 421a-421n stored in the memory 420 causing the processor 410, and thus the server 140, to implement one or more method steps as described. The processor 410 is thus arranged to access the memory 420 and retrieve and store any information therefrom and thereto. Moreover, the processor 410 is configured to control the communication through the communication interface 430 with any external unit, such as with the sensors. The processor 410 may also be configured to control the output of information, i.e. data. The processor 410 may also be configured to control storing of received and delivered information. For sake of clarity, the processor herein refers to any unit suitable for processing information and control the operation of the apparatus, among other tasks. The mentioned operations may e.g. be implemented with a microcontroller solution with embedded software. Similarly, the invention is not limited to a certain type of memory only, but any memory type suitable for storing the described pieces of information may be applied in the context of the present invention.

An example of the invention also relates to a non-transitory computer-readable storage medium, which stores at least portions of computer program code, wherein the portions of computer program code are computer-executable to implement the method steps of a user equipment of the subscriber A as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a subroutine, element or other unit suitable for use in a computing environment. A computer program code may be deployed to be executed on one processor or on a plurality of processors arranged in the user equipment.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating information, wherein:
   the information relates to a subscriber B with respect to a call connection attempt from a subscriber A to the subscriber B by a server, the method comprising:
   receiving event data representing the call connection attempt related events,
   determining if the event data comprises an event representing a busy state,
   in response to a determination that the event data comprises the event representing the busy state determining if the previous event to the event representing the busy state represents a call ringing state,
   in response to a determination that the previous event to the event representing the busy state represents the call ringing state generating an indication that the call connection attempt is rejected by the subscriber B,
   in response to a determination that the previous event to the event representing the busy state does not represent the call ringing state generating an indication that the call connection attempt did not reach the subscriber B, and
   in response to the generation of the indication that the call connection attempt has not reached the subscriber B, generating a notification of a missed connection attempt to the subscriber B.

2. The method of claim 1, the method further comprises, in response to a determination that the previous event to the event representing the busy state represents the call ringing state, that:
   duration of the ringing state is determined,
   the duration is compared to a timeout value representing a value of time defining a period of time of rejecting the call connection attempt by a communication network implementing the call connection attempt, and
   in response to a detection that the duration of the ringing state exceeds or corresponds to the timeout value, generating an indication that the call connection attempt is rejected by the communication network, and
   in response to a detection that the duration of the ringing state is below the timeout value, generating the indication that the call connection attempt is rejected by the subscriber B.

3. The method of claim 2, wherein the duration of the ringing state is determined by one of the following: by determining a period of time between an instant of time when the event representing the busy state is received and an instant of time when the event representing the ringing state is received, by obtaining a timer value triggered in response to a receipt of the ringing state and stopped in response to the receipt of the busy state.

4. The method of claim 1, wherein the event data is received from an intelligent network.

5. The method of claim 1, wherein the event data received is stored in a memory accessible by the server.

6. The method of claim 1, wherein the determination with respect to the event is performed by:
   obtaining at least one identifier from the event data, and
   comparing it to at least one comparison data value representing at least one state of a subscriber.

7. A server for generating information, wherein:
   the information relates to a subscriber B with respect to a call connection attempt from a subscriber A to the subscriber B, the server comprising:
   at least one processor;
   at least one memory including computer program code;
   the at least one memory and the computer program code configured to, with the at least one processor, cause the server to perform:
   receive event data representing the call connection attempt related events,
   determine if the event data comprises an event representing a busy state,
   in response to a determination that the event data comprises the event representing the busy state determine if the previous event to the event representing the busy state represents a call ringing state,
   in response to a determination that the previous event to the event representing the busy state represents the call ringing state generate an indication that the call connection attempt is rejected by the subscriber B,
   in response to a determination that the previous event to the event representing the busy state does not represent the call ringing state generate an indication that the call connection attempt did not reach the subscriber B, and
   in response to the generation of the indication that the call connection attempt has not reached the subscriber B, generate a notification of a missed connection attempt to the subscriber B.

8. The server of claim 7, the server is further configured to, in response to a determination that the previous event to the event representing the busy state represents the call ringing state:
   determine duration of the ringing state,
   compare the duration to a timeout value representing a value of time defining a period of time of rejecting the call connection attempt by a communication network implementing the call connection attempt, and
   generate, in response to a detection that the duration of the ringing state exceeds or corresponds to the timeout value, an indication that the call connection attempt is rejected by the communication network, and
   generate, in response to a detection that the duration of the ringing state is below the timeout value, the indication that the call connection attempt is rejected by the subscriber B.

9. The server of claim 8, wherein the server is configured to determine the duration of the ringing state by one of the following: by determining a period of time between an instant of time when the event representing the busy state is received and an instant of time when the event representing the ringing state is received, by obtaining a timer value triggered in response to a receipt of the ringing state and stopped in response to the receipt of the busy state.

10. The server of claim 7, wherein the server is configured to receive the event data from an intelligent network.

11. The server of claim 7, wherein the server is configured to store the event data in a memory accessible by the server.

12. The server of claim 7, wherein the server is configured to perform the determination with respect to the event by:
   obtaining at least one identifier from the event data, and
   comparing it to at least one comparison data value representing at least one state of a subscriber.

13. A system for generating information, wherein:
   the information relates to a subscriber B with respect to a call connection attempt from a subscriber A to the subscriber B, the system comprising:
   a call connection unit,
   a server,
   in the system the server is configured to:
   receive event data representing the call connection attempt related events from the call connection unit,
   determine if the event data comprises an event representing a busy state,
   in response to a determination that the event data comprises the event representing the busy state determine if the previous event to the event representing the busy state represents a call ringing state,
   in response to a determination that the previous event to the event representing the busy state represents the call ringing state generate an indication that the call connection attempt is rejected by the subscriber B,
   in response to a determination that the previous event to the event representing the busy state does not represent the call ringing state generate an indication that the call connection attempt did not reach the subscriber B, and
   in response to the generation of the indication that the call connection attempt has not reached the subscriber B, generate a notification of a missed connection attempt to the subscriber B.

14. A computer program product comprising at least one non-transitory computer-readable storage medium having computer-executable program code instructions stored therein for performing the method of claim 1 when the computer program product is executed on a computer.

15. A computer program product comprising at least one non-transitory computer-readable storage medium having computer-executable program code instructions stored therein for performing the method of claim 2 when the computer program product is executed on a computer.

16. A computer program product comprising at least one non-transitory computer-readable storage medium having computer-executable program code instructions stored therein for performing the method of claim 3 when the computer program product is executed on a computer.

17. A computer program product comprising at least one non-transitory computer-readable storage medium having computer-executable program code instructions stored therein for performing the method of claim 4 when the computer program product is executed on a computer.

18. A computer program product comprising at least one non-transitory computer-readable storage medium having computer-executable program code instructions stored therein for performing the method of claim 5 when the computer program product is executed on a computer.

* * * * *